April 21, 1970   JEAN-CLAUDE BOURDIER ET AL   3,507,570
COMPOSITE OPTICAL DISPLAY SYSTEM
Filed March 11, 1968                         2 Sheets-Sheet 1
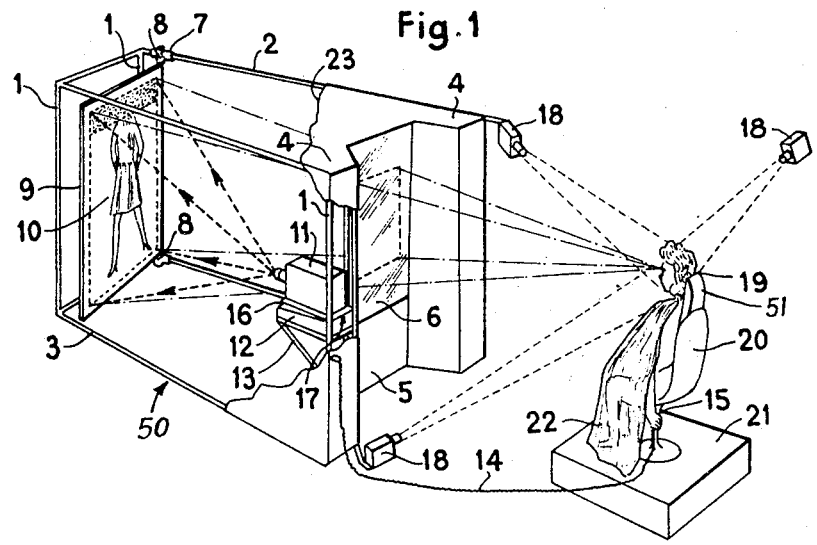
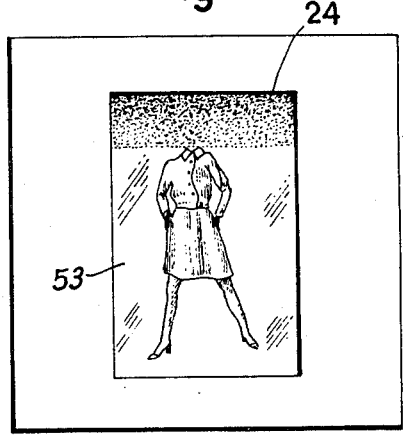
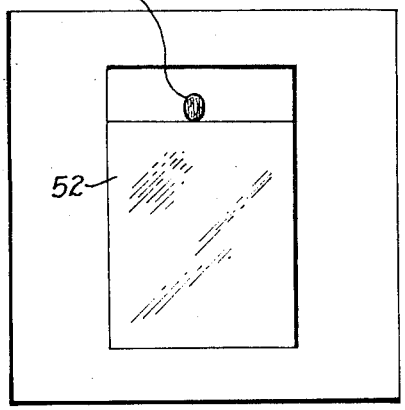
INVENTORS
JEAN-CLAUDE BOURDIER
PHILIPPE DE FELS
By Cushman, Darby & Cushman
ATTORNEYS United States Patent Office 3,507,570
Patented Apr. 21, 1970

3,507,570
COMPOSITE OPTICAL DISPLAY SYSTEM
Jean-Claude Bourdier and Philippe De Fels, Paris, France, assignors to Audio-Visuel France, Paris, France, a corporation of France
Filed Mar. 11, 1968, Ser. No. 712,226
Claims priority, application France, Sept. 18, 1967, 121,362; Nov. 16, 1967, 128,470
Int. Cl. G03b 21/26, 21/22
U.S. Cl. 353—28           8 Claims

ABSTRACT OF THE DISCLOSURE

A black-draped subject 19 looking through semi-transparent mirror 6 sees the reflection of her own face in the mirror as formed on the plane of a screen 10, together with the projected image of a slide formed by projector 11 on the screen 10. The slides represent headless models wearing different articles of clothing whereby the subject appears to see composite pictures of herself as though wearing the articles.

BACKGROUND OF THE INVENTION

This invention relates to optical display systems of the type enabling a subject using the system to view a composite picture showing part of the subject him (or her) self together with some separate article or object as though the subject were actually wearing such article. For instance, such a system when used in a ladies' hairdressing salon or at a milliner's, might allow a customer to sample the effect of various hairdos, or hats, and choose the most becoming one without actually having to try them one.

Systems of this general kind have already been proposed and have utilized various optical expedients for producing the composite pictures. However, none of such prior devices so far as are known to the applicant, has been entirely satisfactory.

Perhaps the simplest type of systems uses a semi-transparent mirror positioned before the subject, with means for positioning the actual articles to be displayed, at a suitable position behind the mirror, so that a subject when looking at the semi-transparent mirror will see the reflected image of her or his face or figure, together with the article, as seen by transparency through the semi-transparent mirror so that it will seem to be naturally joined with the reflected image. Systems of this kind are advantageously simple, but have the serious drawback that they require a large number of the articles, samples or models to be physically present in the system and hence will in many instances involve a prohibitive amount of storage space and manipulation.

Other composite display systems have accordingly been proposed in which these difficulties are eliminated through the use of projection slides for displaying the images of the articles in the composite pictures, thereby dispensing with the need for a physical presence of the actual articles. Slides, of course, are much easier to store in large numbers and more convenient to manipulate, than can be the articles themselves.

One apparatus of this last-mentioned type consists of a viewing tube having a semi-transparent mirror inserted in its end directed towards the subject. Mounted in the tube behind the mirror is a projecting device for projecting any one of a series of illuminated slides representing the articles to be displayed, and an optical lens system so arranged as to form a virtual image of the slide in the same plane as that in which the virtual, reflected image of the viewer's face as formed by the input mirror, is located.

In such a system, the diameter of the tube and input mirror is limited by the diameter of the lenses in tube. A convex mirror is generally used as the semi-transparent input mirror in order to increase the viewing field. Even then however, the display in such an apparatus is restricted to a view of the subject's face and head, and this is displayed on a greatly reduced scale. If it were desired to display the subject's whole figure, as would be necessary in order to display fashion models of dresses, etc., the viewing tube and the entire optics therein would have to have an enormous, and practically phohibitive, diameter.

Accordingly, for the full-figure display of fashion models the following device has been used. A projection screen is provided, and the subject is positioned against one side of the screen with her head extending above the upper end of the screen. Slides representing the fashion models to be displayed are projected, on the side of the screen opposite to the side at which the subject is standing, with an enlargement such that the projected slide image is scaled to the natural size of the subject. A fully reflective mirror positioned in front of the observer, i.e. behind the screen, then provides a full-scale composite picture. In order for such a set-up to be operative, the viewer's body must be closely pressed against the screen in an uncomfortable position. The viewer's position is rendered even more inconvenient owing to the blinding glare of the slide-projector beam directed at the screen.

SUMMARY OF THE INVENTION

Objects of this invention include the provision of a composite display system of the specified type which will be free from the above-enumerated drawbacks of prior systems and will possess various additional advantages thereover. According to specific objects attained by the invention, there is provided a composite display system which will be convenient and practical to use and operate, will enable a full-figure, full-size display under comfortable conditions for the viewer, can be readily adjusted and operated by the user, and/or an assistant, in order to view sequentially a series of composite picture displays, at a rate as fast or slow as desired, in a particularly desirable semi-automatic process. Further objects will appear.

According to a basic aspect, the invention provides a system for displaying to a viewer composite views including part of said viewer together with the image of an article as though said article were actually associated with said part of, or worn by, the viewer, which system comprises: a semi-transparent input mirror; a projection screen positioned wholly outside the region extending between the input mirror and the viewer; and projection means arranged for projecting on said screen any one of a set of slides representing said articles, said projection means providing an image of said slide on a plane that coincides with the virtual image plane of said part of the viewer as formed by said input mirror, whereby said composite view will be observable by the viewer through the input mirror.

In one embodiment of the invention, said screen is positioned on said virtual image plane, and the slide image is hence a real image projected by the projector on the screen.

In other embodiments, the screen is positioned in laterally displaced position from a perpendicular line extended from the viewer through the input mirror, and the slide image is a virtual image of said screen, as formed by at least one mirror, upon said virtual image plane.

Exemplary embodiments of the invention will now be disclosed with reference to the accompanying drawings.

BRIEF DESCRIPTION OF THE DRAWINGS

FIG. 1 is a simplified perspective view, with parts broken away, showing a first embodiment;

FIG. 2 shows a type of slide usable in the system of FIG. 1;

FIG. 3 shows a slide usable for position-adjusting purposes;

DETAILED DESCRIPTION

Figure 4:
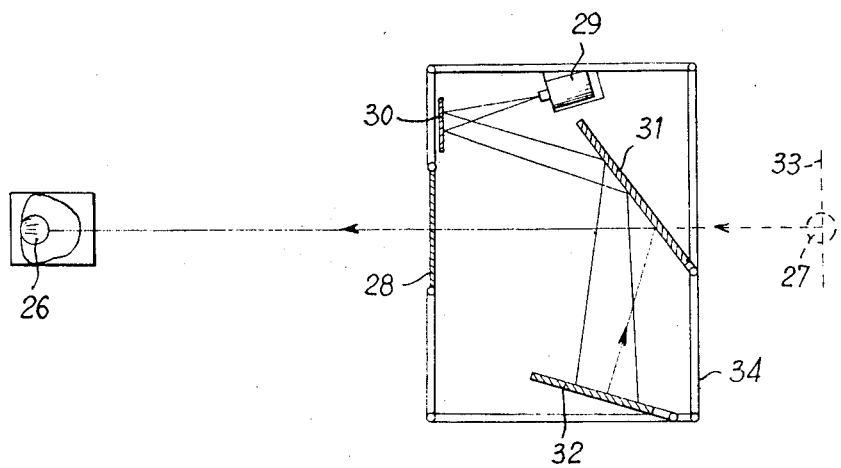
FIGS. 4 and 5 are optical diagrams illustrating two respective modified embodiments of the invention.

The apparatus illustrated in FIG. 1 comprises a cubicle forming a camera obscura 50 defined by frame structure which may be e.g. of welded tubular construction. The frame structure is shown as including four uprights 1 interconnected by a top horizontal frame 2 and a bottom horizontal frame 3. Said frames 2 and 3 are formed, at the front end of the structure (the righthand end as shown) with forwardly jutting noses 4 at their sides, whereby a vertically extending recess 5 is defined in the front end of the structure. Mounted in the wall of this recess is a semi-transparent plane mirror 6, which extends over part of the area of said well 5 intermediate its top and bottom ends, substantially as shown.

Except for the semi-transparent mirror 6, the remaining wall surfaces of the frame structure is covered with a suitable dark covering 23, e.g. black cloth, which is substantially light-tight.

Means are provided for adjustably supporting a projection screen 10 within the dark cubicle 50 near the rear (left) end thereof. The screen supporting means comprises a rectangular frame 9 across which said screen 10 is secured, the frame 9 being supported for pivotal adjustment about one of its vertical sides by means of a pair of vertically aligned hinge members 8 projecting from respective sleeves 7 which in turn are slidably mounted on the longitudinal side members of the top and bottom frames 2 and 3 at a common side of the structure as shown. Any suitable means, such as set screws not shown, are provided for blocking the sleeves 7 in an adjusted position along said frame side members, and for blocking the screen supporting frame 9 in a pivotally adjusted position about the hinges 8.

A slide projector device 11 is supported within cubicle 50 near the front end thereof, for projecting any of a series of selected slides upon the screen 10. The projector supporting means comprises a shelf or table member 12 supported on a console or bracket 13 which may be welded to the general frame structure. Conventional remote control means for controlling the operation of projector 11 in a manner that will later appear more clearly, is shown as including a flexible cable 14 connected to the projector unit and extending out of the cubicle 50 and having a controller, unit 15 attached to its free end, for actuation in a manner later described.

As shown the projector supporting system includes means for positionally adjusting projector device 11 longitudinally towards and away from the screen 10, and further means for pivotally adjusting the projector device up and down about a horizontal axis extending at the rear end thereof. For this purpose, the table 12 is mounted for longitudinally sliding movement relative to bracket 13 by means of a conventional rail-and-roller arrangement, not shown in detail; and further, table 12 carries a platen 16 pivoted thereon about a transverse axis 17 at the rear end of said table, on which platen 16 the projector 11 is supported. Preferably though not necessarily, both the longitudinal positioning and the pivotal movements of the projector mounting device just described, are effected by way of respective electric motors or equivalent actuators, which may be of entirely conventional nature and are not therefore shown. Preferably also, said actuator means are controllable by way of the remote control cable means 14 from the controller 15 attached to the cable.

Means are provided for supporting a seated subject 19 outside the cubicle 50 and spaced from the forward end thereof at which the mirror 6 is mounted. The subject supporting means are shown as including a low dais or platform 21 with a swivel-chair 20 thereon. The subject, illustrated as a female, is shown as wearing a black cloak or cape concealing the front of her body directed towards mirror 6, further, light projector means, here shown as including three projectors 18, are provided at suitable positions for illuminating only the subject's face, it being understood that the projectors 18 constitute the sole, or main, source of illumination for the room in which both the cubicle 50 and the subject are located.

The subject supporting means just described are so positioned, and the longitudinal position of screen 10 in the cubicle is so adjusted, that the distance from mirror 6 to screen 10 is substantially equal to the distance from the subject's face to said mirror 6. In these conditions, it will be evident that the seated subject 19 will see the reflection of her brightly illuminated face as a virtual image produced in semi-transparent mirror 8, which image will be positioned substantially in the same plane as the plane of the screen 10.

A set of diapositive photographic slides are provided for projection by means of projector device 11 on screen 10, each slide being of a general type as shown in FIG. 2. That is, each slide is obtained as a diapositive photographic print of a clothed, "headless" model. Such prints can very conveniently be produced by the conventional method of photographing the clothed model against a dark background with the model wearing a black cowl or hood. However, other methods can be used with the same result, such that the slide includes a uniformly black upper section 24 where the model's head ought to be located.

With a slide of the character just described projected on the screen 10, it will readily be understood that, provided all adjustments have been correctly effected, the seated subject 19 when looking through the semi-transparent input mirror 6 at screen 10, will see a composite picture which will include the clothed figure of the model, and the subject's own face connected therewith in what will appear to be a complete, natural picture.

The adjustments required for successfully achieving such result include the following.

The light intensities of the slide projector 11 and the light projectors 18 should be so adjusted with respect to each other that the images of the slide and the subject's face on screen 10 shall be of equal brightness. This lighting or photometric adjustment can very easily be effected once for all, with only minor occasional readjustments in the presence or absence of a subject.

The positional adjustment of screen 10 towards and away from mirror 6 can at best to a first approximation, also be made once for all since the position of the subject's face is fixed and well defined owing to the head-rest 51 shown provided on the chair 20. If desired, however, means may be provided for modifying the position of screen 10 by remote control. For this purpose electric motor means not shown, such as conventional linear (or revolving) motors may be associated with the sleeves 7 for displacing them along the side members of frames 2 and 3, said motors being actuated to their on and off conditions through remote control 14 from controller 15, either by the seated subject herself or by an assistant.

Depending on the subject's tallness, a degree of vertical relative adjustment will generally be required as between the reflected image of the subject's face and the projected image of the slide. This is easily taken care of through the pivotal adjustment of the supporting platen 16 of the projector device 11 about its pivot axis 17, by means of the controller 15.

Variations in general body size among various subjects may require adjustment of the general dimensions of the slide image projected on screen 10. For this purpose it is only necessary to adjust the longitudinal position of table 12 on bracket 13, again by way of controller 15 and remote control cable 14.

It will be noted that owing to the provision for the longitudinal and vertical adjustments of projector 11, as just described, it will in most cases be superfluous to provide more than one set of slides such as the one shown in FIG. 2, since a single set of such slides, showing one model dressed in a variety of clothes, can successfully be used for display with subject-viewers having a wide range of sizes and body measurements.

Very conveniently, the projector device 11 is of the conventional type that includes an automatic slide feeding arrangement, which is remotely operable through cable 14 from controller 15 to advance a fresh slide into viewing position while removing the slide last viewed. Preferably moreover, this arrangement is of the cyclic feeding type in which a slide is advanced to viewing position from the head of a series of slides contained in the feeder device and a viewed slide is put back at the tail end of the series in the feeder. In this way, regardless of the number of slides in the series, as dictated e.g. by the number of dress models in a fashion display, the series of slides can be inserted into the feeder device, and the slides can be viewed one by one as the customer seated in chair 20, or the shop assistant, successively actuates a control such as a push-button on the controller unit 15 in order to display before the customer's eyes in succession a series of composite views, which simulate the customer herself as wearing each dress of the collection on display.

In order to facilitate the above described adjusting operations specifically as regards the obtaining of a perfectly continuous and natural-seeming connection between the head and body in the composite picture viewed by the subject, the set of slides insertable into the feeder of projector 11 may desirably include, as the initial slide of the series, an adjusting slide of the type shown in FIG. 3. Such adjusting slide may, as shown, be uniformly dark in its major lower portion 52 which corresponds to the useful portion 53 of a slide of the type shown in FIG. 2, and may show in its upper portion only a "head" 25 at the precise position where the head of the model in said slide of FIG. 2 should be located. With such an adjusting slide inserted at the head of the series of slides in the projector feeder, the subject (or shop assistant) can operate the controller 15 to modify the above described adjustments, including specifically the vertical pivotal adjustment of projector 11 about the pivot axis 17, until the projected image of the "head" 25 on the adjusting slide precisely coincides in position with the reflected image of the viewer's own head. If desired, such preliminary register adjustment may be effected by the shop assistant seated in chair 20 in the absence of a customer.

The purpose of the earlier-described pivotal mounting of the screen frame 9 about the vertically aligned hinges 8 is to correct for parallax error in the image projected on the screen 10. That is, it will be noted that projector 11 is shown mounted at one side of semi-transparent mirror 6 so as not to obstruct the cone of visual rays from the eyes of subject 19 through mirror 6 to screen 10. This lateral displacement of the projector 11 results in a parallax error which can readily be compensated for by suitable pivotal adjustment of screen 10 as described.

While the optical system described with reference to FIG. 1 is particularly simple, it will be noted that the longitudinal dimension, or depth, of the cubicle 50 must be approximately equal to the distance of the subject from the front wall of the cubicle since said cubicle depth is determined by the mirror-screen spacing, which must be equal to the subject-mirror distance. This last distance may have to be quite large where a full size view of the subject's figure is desired, and in such cases the whole installation may take up an excessive amount of space and be unpractical on that count in a small shop for instance.

Another factor that may tend to increase the depth of the cubicle 50 and lead to a generally similar inconvenience is the necessity of selecting the projector-screen spacing great enough to afford the desired enlargement of the projected slides.

The above difficulties are eliminated or reduced in the modified embodiments of the invention now to be described.

Referring to FIG. 4, there is provided a rectangular cubicle 34 having a semi-transparent plane input mirror 28 mounted in its front wall. Positioned in the cubicle 34 near the rear wall thereof is a fully reflective plane mirror 31 which is inclined to a direction perpendicular to mirror 28, as shown. A screen 32 is mounted in the cubicle near one side wall of it, and a slide projector 29 associated with a further fully-reflective mirror 30 are located near the other cubicle side wall. The positions and angles of the various optical elements just described are so predetermined, in a manner that will be readily understood by those familiar with the art, that the projection beam from projector 29, after reflection first on mirror 30 and then on mirror 32, produces a real image of a slide positioned in said projector, upon the screen 32, and that said real image, after further reflection on mirror 31, will form a virtual image in the plane indiacted at 33 (the virtual image plane of screen 32 in mirror 31), which virtual image lies substantially on the perpendicular line extended through the center of semi-transparent mirror 28. A subject, such as a seated person draped in black and with a sharply illuminated face, as earlier described with reference to FIG. 1, is indicated at 26, being so spaced from semi-transparent mirror 28 that said subject's virtual image therein will form at 27, on the above described image plane 33 of the screen 32. Thus the same effect as in FIG. 1 is achieved, with the additional advantage that the depth of cubicle 34 can be made substantially less than that of cubicle 50 of FIG. 1, for a given distance from the subject to the semi-transparent input mirror.

Figure 5:
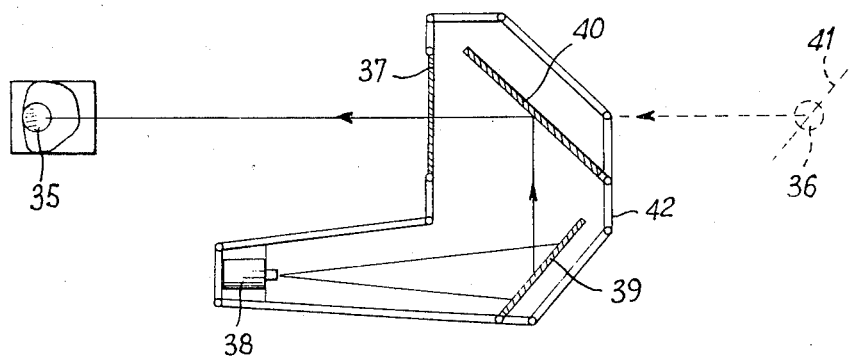

In the further modification shown in FIG. 5, the cubicle 42 has a semi-transparent mirror 37 mounted in its input or front wall, and an inclined fully-transparent mirror 40 in its rear wall, similar to the arrangement of FIG. 4. Laterally, cubicle 42 is formed with a forwardly jutting extension of substantial length in the end of which a projector 38 is positioned. A screen 39 is mounted in the rear side portion of the cubicle at a position and angle such that the virtual image 41 of screen 39 as formed in mirror 40 is positioned generally on the perpendicular extending through the center of input mirror 37, whereby a subject viewer 35 positioned a predetermined distance in front of said input mirror will observe his or her own reflected image 36 in said semi-transparent mirror, super-imposed over the virtual image 41 of the screen 39, thus again achieving the desired composite viewing effect. It will be noted that in this arrangement although the image 41 of the screen 39 is inclined obliquely to the line of sight, such obliquity is inherently corrected by the parallax effect of inclined screen 39.

It will be understood that in each of the modifications diagrammatically shown in FIGS. 4 and 5, the practical construction would include many of the constructional details described with reference to FIG. 1, such as the means for positional and angular adjustment of the projector and screen and the provisions for remote control. The additional optical elements provided in these modifications, such as mirrors 30 and 31 in FIG. 4, and mirror 40 in FIG. 5, preferably also are made adjustable at least angularly.

Various modificatioins of the invention other than those specifically illustrated and described herein may be conceived without exceeding the scope of the invention. According to one such further modification, a conventional stereoscopic slide projector is used as the projector device 11, 29 or 38, and the slides used are stereoscopic slides each of which may include a pair of similar photographs of the general type shown in FIG. 2, taken from spaced points so as to be adapted for binocular viewing in the conventional manner. The projection screen such as 10, 32, 39 may then be of the conventional stereoscopic type such as one having a vertical lenticular ruled pattern.

In this connection, it is important to note that in the composite scenes viewable by means of the systems of the invention, since the virtual reflected-image portion of the scene (such as the subject's face in the example) is inherently three-dimensional, the provision of stereoscopic means as just described for projecting the remaining portion of the scene, will yield a fully three-dimensional composite picture.

According to a further refinement of the system, a pair of projectors may be used simultaneously to project slides selected from two different sets upon a common screen to be simultaneously viewable thereon together with the viewer-subject's face. The slides in a first set, projected through a first projector of the pair, may for example show only the bust and arms of a model, with different clothes (e.g. bodices) on, whereas the slides of the second set projected through the second projector would show only the pelvis and legs, again with different clothes, such as skirts.

While in all of the systems herein disclosed the composite pictures were described as consisting of a reflected image of the subject's face on the one hand, and a projected image of a slide showing part of a clothed model's figure on the other hand, it will be apparent that generally similar systems can be constructed if desired for the display of other types of composite pictures. Wherein the projected slide pictures may include such articles as headwear, footwear, jewelry, nail varnish, and the like. Applications of the improved composite viewing system of the invention to fields other than fashion also lie within the field of the invention.

We claim:

1. An optical viewing system for displaying to a viewer composite views including part of said viewer in real height together with the image of an article as though said article were actually associated with said part of the viewer, comprising; a light tight cabinet having front and rear walls, a semi-transparent, semi-reflective plane input mirror mounted in the front wall of said cabinet, a projecton screen positioned within said cabinet adjacent the rear wall thereof, projection means including a still image projector mounted within said cabinet for projecting an image, said still image projector being laterally displaced within said cabinet relative to said input mirror and arranged for projecting on said screen any one of a set of still images representing said articles, subject supporting means for positioning the viewer in front of said mirror, said subject supporting means being spaced from said input mirror a distance substantially equal to the distance between said input mirror and said screen so that the desired part of the viewer is symmetrical with the projected image whereby said composite view will be formed on said plane for viewing through said input mirror.

2. A system as claimed in claim 1 wherein said screen is positioned on a symmetrical plane with said image projector and said still image is a real image projected by said image projector on said screen.

3. A system as claimed in claim 1 wherein said screen is laterally positioned to one side of a perpendicular line extended from the viewer through said input mirror.

4. A system as claimed in claim 1 wherein at least one mirror is positioned in the optical path between said image projector and said screen.

5. A system as claimed in claim 1 including means for varying the distance between said input mirror and said screen.

6. A system as claimed in claim 1 including means for varying the angle between the plane of said screen and the plane of said input mirror.

7. A system as claimed in claim 1 including means for varying the distance between said image projector and said screen.

8. A system as claimed in claim 1 including means for varying the angle of said image projector relative to said screen.

References Cited

UNITED STATES PATENTS

| | | | |
|---|---|---|---|
| 1,821,626 | 9/1931 | Fleischer | 353—28 |
| 2,015,665 | 10/1935 | Eitzen | 353—78 X |
| 2,061,378 | 11/1936 | Henze et al. | 353—28 |
| 2,075,198 | 3/1937 | Henze et al. | 35—59 |
| 2,545,675 | 3/1951 | Scott | 95—1.1 |
| 2,899,860 | 8/1959 | Scott et al. | 35—58 |
| 3,373,654 | 3/1968 | Carolan et al. | 353—78 |

FOREIGN PATENTS

| | | |
|---|---|---|
| 634,788 | 2/1928 | France. |
| 578,441 | 6/1933 | Germany. |

NORTON ANSHER, Primary Examiner

R. M. SHEER, Assistant Examiner

U.S. Cl. X.R.

353—74, 77, 79